US008855304B2

(12) United States Patent
Chandrashekar et al.

(10) Patent No.: US 8,855,304 B2
(45) Date of Patent: Oct. 7, 2014

(54) SYSTEM AND METHOD FOR GENERATING SESSION KEYS

(75) Inventors: Abishek Chandrashekar, Bangalore (IN); Prashant Venkatesh Kanakpura, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/245,697

(22) Filed: Sep. 26, 2011

(65) Prior Publication Data

US 2012/0328098 A1 Dec. 27, 2012

(30) Foreign Application Priority Data

Jun. 23, 2011 (IN) .............................. 2123/CHE/2011

(51) Int. Cl.
*H04L 9/00* (2006.01)
*H04L 9/08* (2006.01)
*H04L 9/12* (2006.01)

(52) U.S. Cl.
CPC ................ *H04L 9/12* (2013.01); *H04L 9/0869* (2013.01)
USPC ............................................ 380/46; 709/231

(58) Field of Classification Search
USPC ............................................ 380/46; 709/231
See application file for complete search history.

(56) References Cited

U.S. PATENT DOCUMENTS

| 5,602,917 | A  | * | 2/1997 | Mueller ........................ 380/284 |
| 8,144,875 | B2 | * | 3/2012 | McGough ...................... 380/277 |
| 8,238,551 | B2 | * | 8/2012 | Reznik et al. ................... 380/44 |
| 2002/0094085 | A1 | * | 7/2002 | Roberts ........................ 380/262 |
| 2005/0108378 | A1 | * | 5/2005 | Patterson et al. .............. 709/223 |
| 2008/0065886 | A1 | * | 3/2008 | McGough ..................... 713/168 |
| 2012/0185827 | A1 | * | 7/2012 | Eska et al. .................... 717/121 |

* cited by examiner

*Primary Examiner* — Kambiz Zand
*Assistant Examiner* — Abiy Getachew
(74) *Attorney, Agent, or Firm* — Klarquist Sparkman, LLP

(57) ABSTRACT

The present disclosure describes systems and methods of generating a cryptographic session key based on a known master key shared between a sender communicator and a receiver communicator in a communication network. In one example, a method includes receiving a request from the receiver communicator, by the sender communicator, to establish a communication session between the sender and the receiver communicator. The method further includes generating an open random number signal at the sender communicator and combining the generated open random number signal with the known master key to generate the cryptographic session key.

23 Claims, 6 Drawing Sheets

SYSTEM AND METHOD FOR GENERATING SESSION KEYS

CROSS REFERENCE TO RELATED APPLICATION

This application claims the benefit of and priority to prior Indian patent application number 2123/CHE/2011, entitled "SYSTEM AND METHOD FOR GENERATING SESSION KEYS," filed on Jun. 23, 2011, the entire disclosure of which is hereby incorporated herein by reference.

FIELD

The present disclosure relates generally to the field of cryptography, and in particular, to systems and methods for generating session keys that can be used for encryption and decryption.

BACKGROUND

Generating a session key from a known shared master key is known in the art. However, previous approaches have a number of limitations. For example, storing a large number of keys for session communication has an impact over the performance of a system and may also make the system vulnerable if the security of the system is jeopardized. Another way of creating a session key is by using one-way hash functions. However, generating a session key using a one-way hash function requires complex mathematical operations that come at the expense of computation time. Yet another method of creating a session key known in the art is by exchanging a random signal between each of the communicating users and then using the exchanged random signals to form the new key. However, this method creates overhead, as both parties or communicators are required to compute random numbers for generating the key. Accordingly, there is a need for a method and system of generating a session key so that both the computing time and the memory requirement can be reduced.

SUMMARY

According to one aspect of the present disclosure, a method for generating a cryptographic session key based on a known master key shared between a sender communicator and a receiver communicator in a communication network includes the acts of receiving a request from the receiver communicator, by the sender communicator, to establish a communication session between the sender and the receiver communicator. The method further includes generating an open random number signal at the sender communicator and combining the generated open random number signal with the known master key to generate the cryptographic session key.

According to another aspect of the present disclosure, a system for generating a cryptographic session key includes at least a sender communicator and a receiver communicator. In some examples, each of the sender communicator and the receiver communicator comprise a transceiver configured to send and receive a request to generate an open random signal, a signal generation module configured to generate the open random signal, a plurality of extraction modules configured to create a subset of the open random number signal and a master key, and a splitter module configured to combine the generated open random signal with the master key to generate the cryptographic session key.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

DETAILED DESCRIPTION

Figure 1:
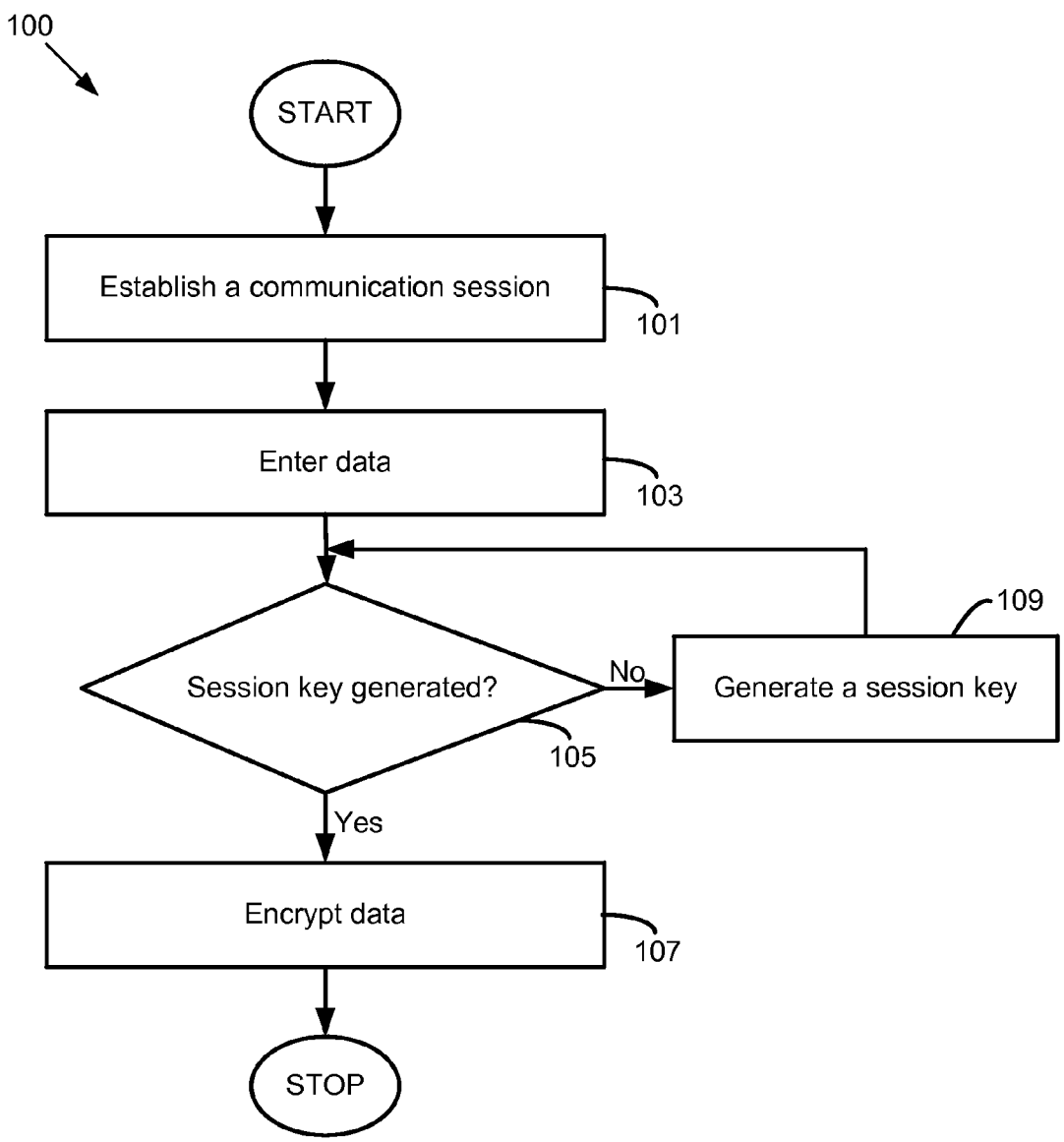
FIG. 1 is a flow chart that illustrates a generalized example of a method for encrypting data using a session key.

The following description is a full and informative description of the best methods and systems presently contemplated for carrying out the presently disclosed technology known to the inventors at the time of filing of this patent application. Of course, many modifications and adaptations will be apparent to those of ordinary skill in the relevant arts in view of the following description, the accompanying drawings, and the appended claims. While the systems and methods described herein are provided with a certain degree of specificity, the disclosed technology may be implemented with either greater or lesser specificity. Further, some of the features of the disclosed technology can be used without the corresponding use of other features described herein. As such, the present description should be considered as merely illustrative of the principles of the present technique and not in limitation thereof.

The present disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises."

The systems, methods, and apparatus disclosed herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Furthermore, any features or aspects of the disclosed embodiments can be used in various combinations and sub-combinations with one another. Furthermore, as used herein, the term "and/or" means any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "receive," "produce," "generate," "associate," "select," "search," and "provide" to describe the disclosed methods. These terms are high-level abstractions of the actual operations that are performed. The actual operations that correspond to these terms can vary depending on the particular implementation and are readily discernible by one of ordinary skill in the art.

Any of the disclosed methods can be implemented with computer-executable instructions stored on one or more computer-readable storage media (e.g., non-transitory computer-readable media, such as one or more volatile memory components (such as DRAM or SRAM), or nonvolatile memory components (such as hard drives) and executed on a computer. Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially-available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, JavaScript, Perl, Python, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Theories of operation, scientific principles, or other theoretical descriptions presented herein in reference to the systems, methods, and apparatus of this disclosure have been provided for the purposes of better understanding and are not intended to be limiting in scope. The systems, methods, and apparatus in the appended claims are not limited to those systems, methods, and apparatus that function in the manner described by such theories of operation.

The disclosed technology provides mechanisms to generate unique session keys easily and with fewer transactional communications between a sender communicator and a receiver communicator. Some examples include generating an open random signal and combining it with a known master key to generate a unique session key. Some examples further include combining the open random signal by splitting the master key and inserting at least a part of the open random signal with each portion of the split master key.

FIG. 1 is a flow chart 100 that outlines an exemplary method for encrypting data using a session key, in accordance with certain embodiments of the disclosed technology. At process block 101, a communication session is established between a sender communicator and a receiver communicator. Once the communication session is established, at process block 103, data is inputted. At process block 105, the inputted data is checked to determine whether a session key has been generated. If the session key has been generated, the input data is encrypted using the session key at process block 107. However, if the session key has not been generated yet, the session key is generated at process block 109 and the method proceeds to process block 105. Details of how the session key is generated are described in further detail below.

Figure 2:
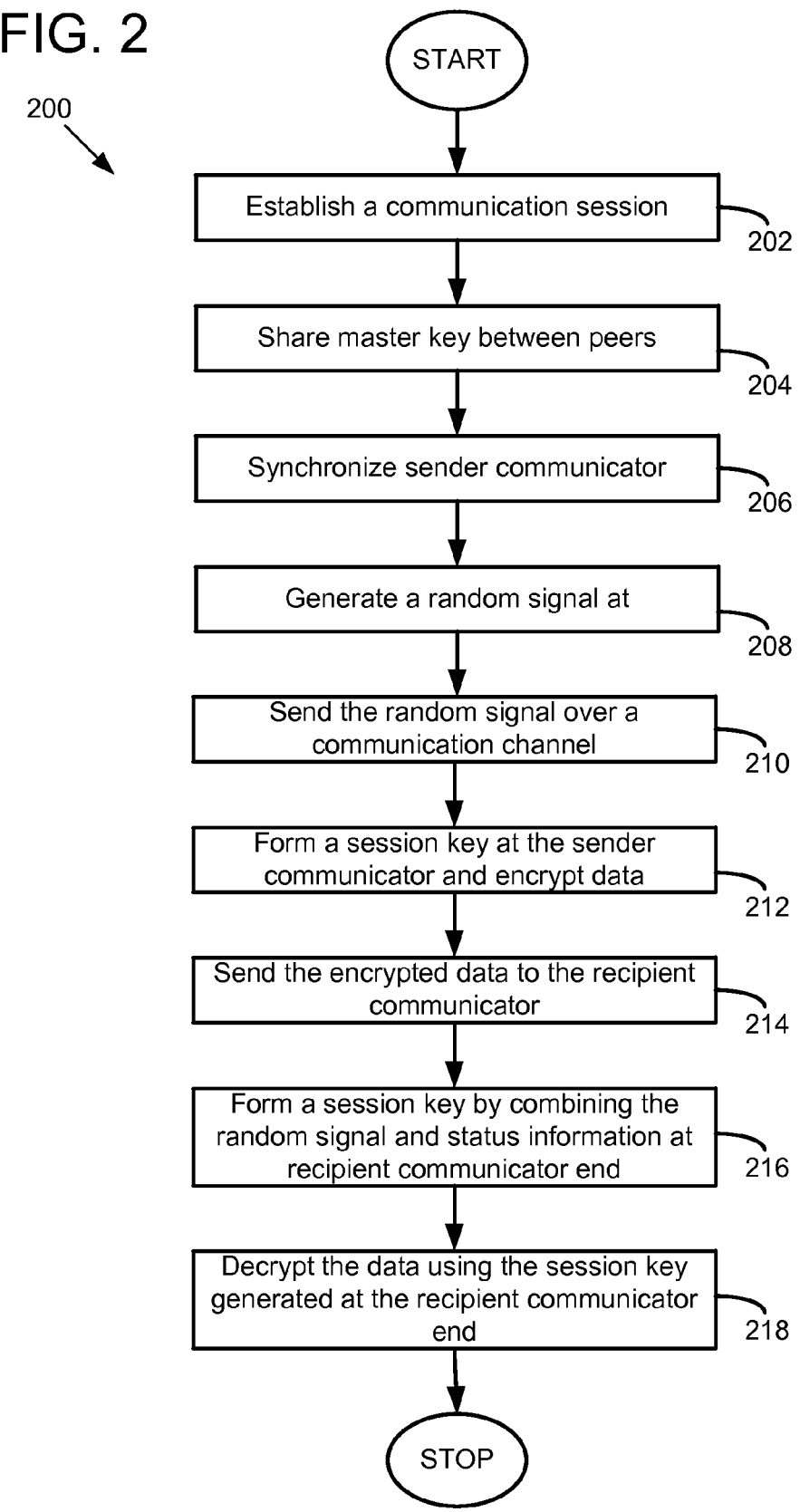
FIG. 2 is a flow chart that illustrates a generalized example of a method for generating a session key using a random signal and status information.

FIG. 2 is a flow chart 200 that outlines an exemplary method for generating a session key using a random signal and status information, in accordance with certain embodiments of the disclosed technology. At process block 202, a communication session is established between a sender communicator and a receiver communicator. At process block 204, a master key is shared between the sender communicator and the receiver communicator. At process block 206, the sender communicator and the receiver communicator are synchronized on the following modules: Pseudo Random Number Generator (PRNG) module, Sieve A, and Sieve B. Details of these modules are explained in further detail in conjunction with FIG. 4. At process block 208, a random signal is generated at the sender communicator end. At process block 210, the generated random signal is transmitted over a communication channel without encryption to the recipient communicator. At process block 212, a session key is formed at the sender communicator end and this key is used to encrypt data. At process block 214, the encrypted data is transmitted to the recipient communicator. At process block 216, a session key is formed at the recipient communicator by combining the random signal (received from sender communicator) and status information. At process block 218, the data is decrypted using the session key generated at the recipient communicator end. It should be noted that in a peer-to-peer network, the communication can also be initiated at the receiver's end, that is, the roles of the sender communicator and receiver communicator described earlier can be reversed. In the case of a client-server architecture, the server, which typically has higher computing power than the client, generates the random signal using the PRNG module.

Figure 3:
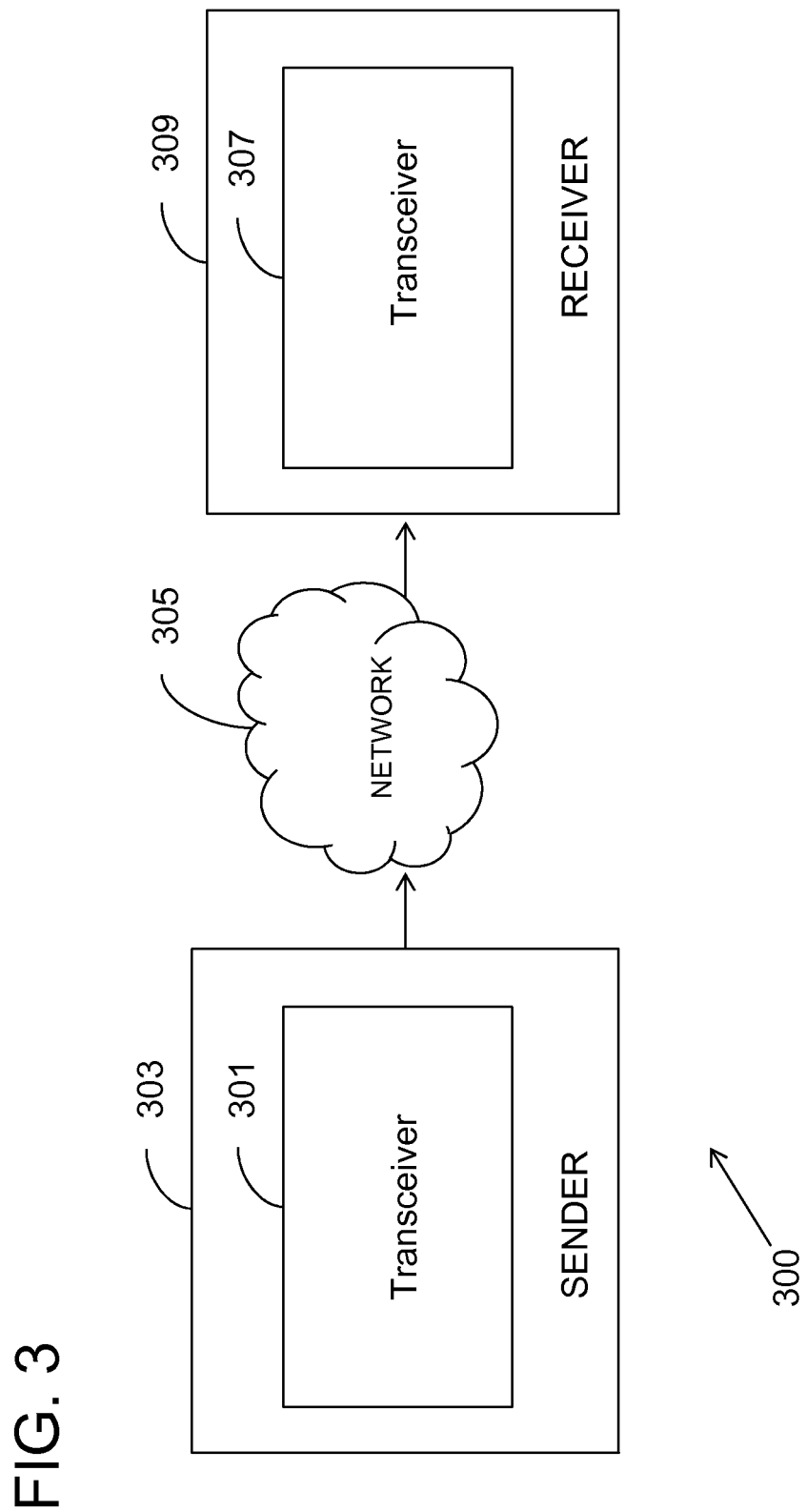
FIG. 3 is a block diagram illustrating a generalized example of a system in which described embodiments, techniques, and technologies can be implemented.

FIG. 3 is a block diagram 300 of an environment in which certain embodiments of the disclosed technology can be practiced. The system includes a sender 303 and a receiver 309. Sender 303 and receiver 309 further include a transceiver 301 and a transceiver 307 respectively. Sender 303 and receiver 309 are connected through a network 305. The typical exemplary network 305 includes a plurality of computers interconnected via a communication network such as an intranet or via a larger communication network, including the global TCP/IP network commonly referred to as the Internet.

Figure 4:
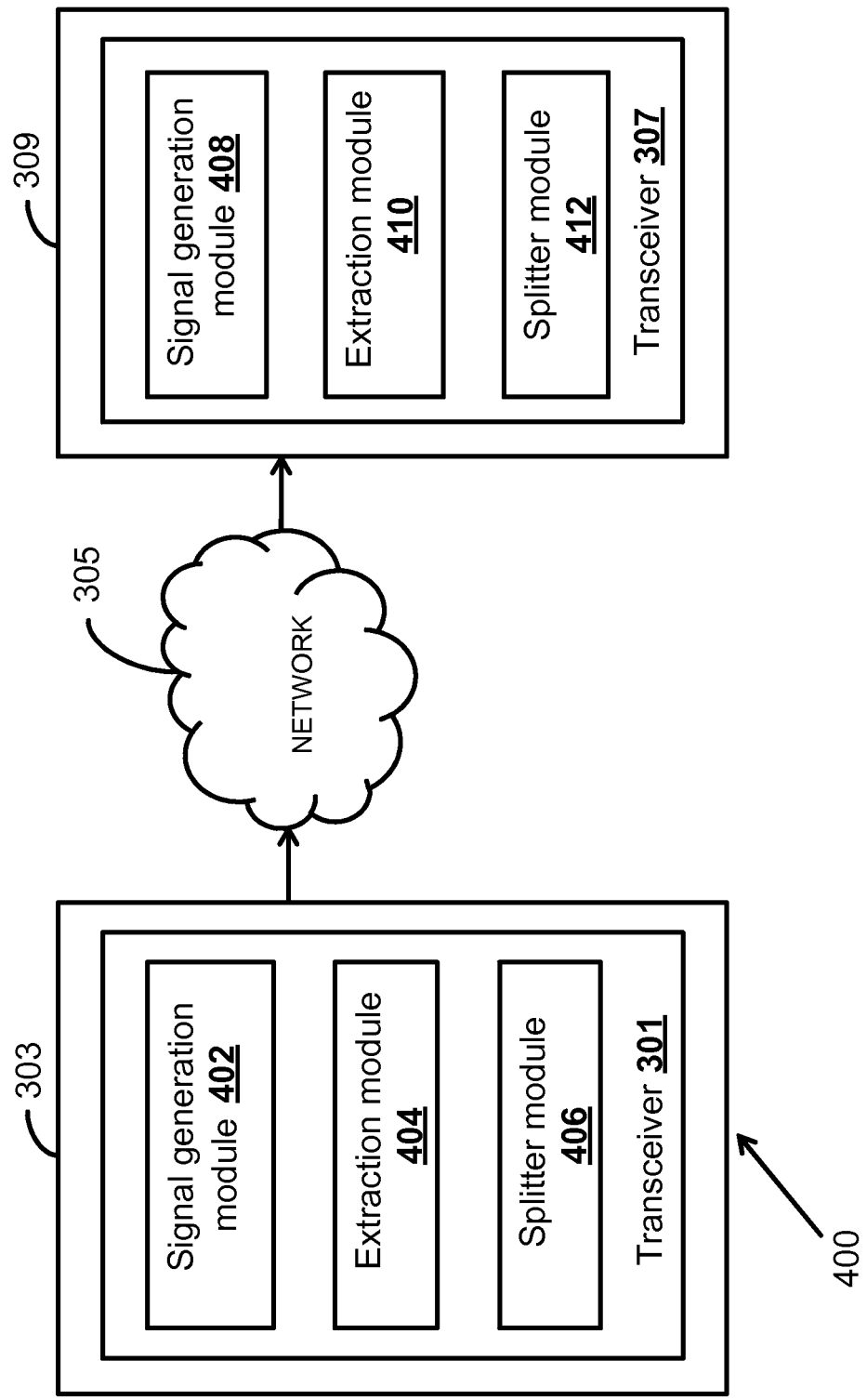
FIG. 4 is a block diagram illustrating a generalized example of a system for generating a session key in which described embodiments, techniques, and technologies can be implemented.

FIG. 4 is a block diagram 400 of a system for generating a session key, in accordance with certain embodiments of the disclosed technology. As shown, the system of FIG. 4 includes a sender 303 and a receiver 309. Sender 303 includes a transceiver 301, whereas receiver 309 includes a transceiver 307. Transceiver 301 further includes a signal generation module 402, an extraction module 404 and a splitter module 406. Transceiver 307 includes a signal generation module 408, an extraction module 410 and a splitter module 412.

Signal generation module 402 creates a random number signal. Extraction module 404 can be any suitable sieve function known in the art. A sieve, as is known, is an algorithm that allows creation of a subset or a new restricted section from a given random signal or a master key. For example, given a set of {1,2,3,4,5,6,7,8,9,0}, the sieve function is a mathematical operator to obtain a given subset such as {1,4,7}. However, this operation of a sieve is determined by its present state, which can be changed in the future. Splitter module 406 determines a section of the master key used in forming the session key. Signal generation module 408, extraction module 410, and splitter module 412 are similar to signal generation module 402, extraction module 404, and splitter module 406, respectively, and are not described again for the sake of brevity.

Figure 5:
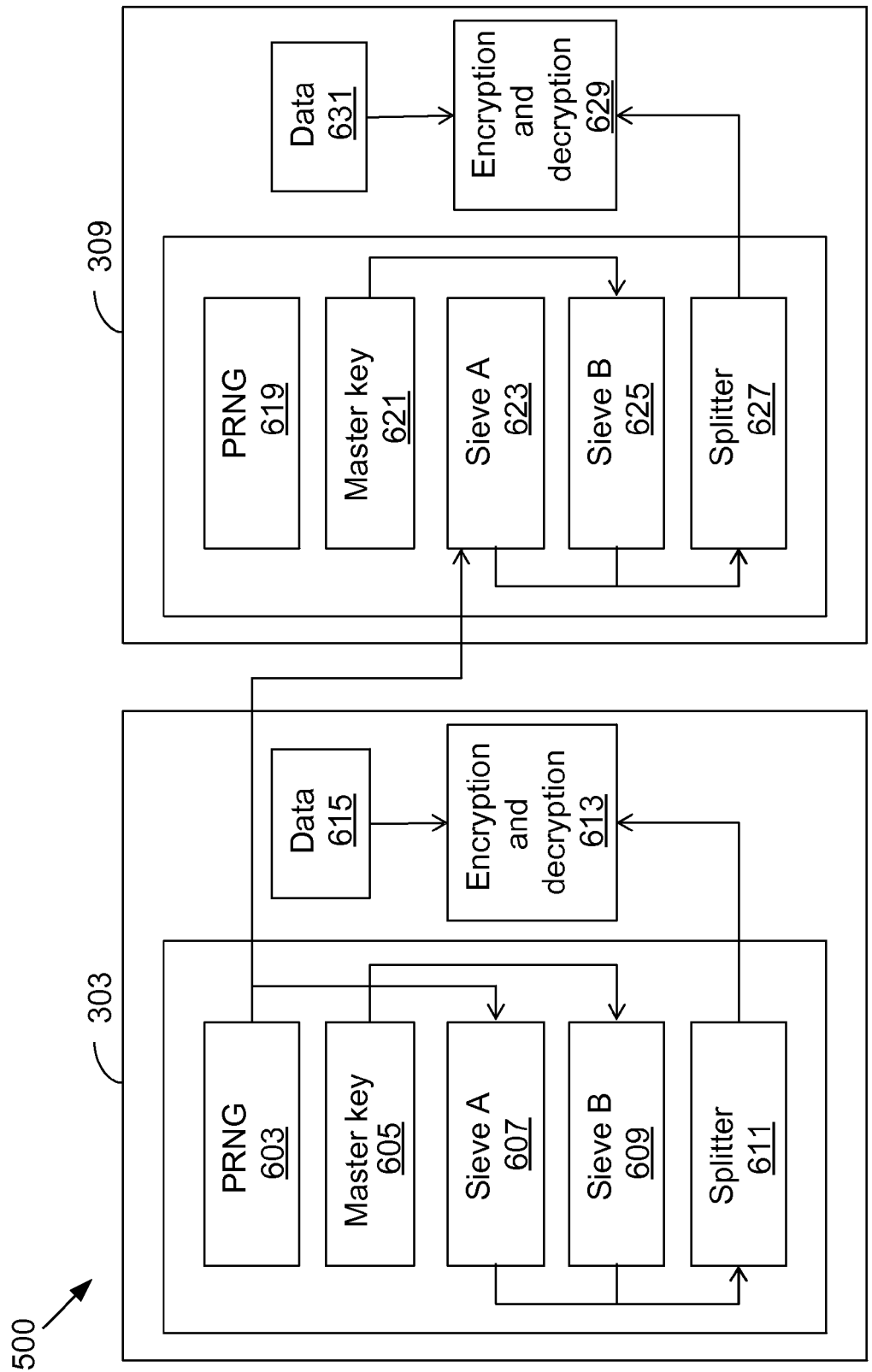
FIG. 5 is a block diagram illustrating another generalized example of a system for generating a session key in which described embodiments, techniques, and technologies can be implemented.

FIG. 5 is a block diagram 500 of a system for generating a session key, in accordance with certain embodiments of the disclosed technology. The system 500 includes a sender 303 and a receiver 309. The sender 303 includes a PRNG (Pseudo Random Number Generator) module 603, a master key 605, a sieve A 607, a sieve B 609, a splitter 611, an encryption and decryption module 613, and data 615. PRNG module 603 generates a random number signal, which is input to sieve A 607. Master key 605, which is known to both sender 303 and receiver 309, is input to sieve B 609. The output of sieve A 607 and sieve B 609 is input to splitter 611. Splitter 611 mathematically combines master key 605 with the randomly generated signal to form a unique session key. Encryption and decryption module 613 encrypts (or decrypts) data 615 using the generated unique session key. The state of PRNG module 619 in receiver 309 depends on PRNG module 603. The random signal generated by PRNG module 603 of sender 303 is input to sieve A 623 of receiver 309. Master key 621, which is known to both sender 303 and receiver 309, is input to sieve B 625 of receiver 309. The output of sieve A 623 and sieve B 625 is input to a splitter 627. Splitter 627 mathematically combines master key 521 with the randomly generated signal to form a unique session key. The session key thus formed is used to decrypt data.

In accordance with certain embodiments of the disclosed technology, the mathematical operation performed on open random signal and a known master key is shown in Table 1.1, below.

TABLE 1.1

| XXX (State Bits) | Operation | Comments |
|---|---|---|
| 000 | P + S | Last bit inverts if switched to 1 |
| 001 | S + P | |
| 010 | $P_{1/n} + S_{n-1/n} + P_{n-1/n} + S_{1/n}$ | Penultimate bit splits the keys |
| 011 | $S_{1/n} + P_{n-1/n} + S_{n-1/n} + P_{1/n}$ | |
| 100 | Switch to the next key | Switches the splitting mechanism |

In Table 1.1, (P) denotes the master key, (S) denotes the random signal and (+) is an operator used to signify a combination and which can be any mathematical or logical operation. The state to shift is predefined and is shared beforehand between sender 303 and receiver 309 communicator to uniquely identify the sequence. The XXX (State Bits) are switched from time to time to achieve perturbation of the key.

In certain embodiments, when the initial state of XXX (State Bits) is 000, it implies an append operation of the master key and the random signal. For example, if the master key (P) is {3,1,7,4,5,9} and the random signal is {P,A,X,Y,Z,B}, then as per the present state 000 the new session key will be generated as {3,1,7,4,5,9,P,A,X,Y,Z,B}.

In the next state, when the last bit is switched to one, the state of XXX (State Bits) will become 001. This implies an inversion operation of the master key and the random signal. For example, if the master key (P) is {3,1,7,4,5,9} and the random signal is {P,A,X,Y,Z,B} then as per the present state 000 the new session key will be generated as {P,A,X,Y,Z,B,3,1,7,4,5,9}.

In the next state, the penultimate bit is switched to one so that the next state of XXX (State Bits) is 010. This implies a splitter operation to be performed on the master key and the random signal. For example, if the master key (P) is {3,1,7,4,5,9} and the random signal is {P,A,X,Y,Z,B} and the split position (n) is three then as per the present state 010 the new session key will be generated as {3,1,7,P,A,X,4,5,9,Y,Z,B}. Similarly, when the state of XXX (State Bits) is 011, it implies a split and inversion operation. For example, if the master key (P) is {3,1,7,4,5,9} and the random signal is {P,A,X,Y,Z,B} and the split position (n) is three then as per the present state 010 the new session key will be generated as {P,A,X,4,5,9,Y,Z,B,3,1,7}.

In certain embodiments, sieve A 607 and sieve B 609 of sender 303 are synchronized with sieve A 623 and sieve B 625 of receiver 309. The XXX bit information is switched from time to time to achieve perturbation of the key. When the state of XXX (State Bits) is 100 it will switch the splitting mechanism to the next state in such a manner that the sieves of both sender 303 and receiver 309 are synchronized in accordance with the next state.

Thus, the disclosed technology provides an alternative mechanism for generating a session key. The disclosed methods and systems address reduction in computation time, space requirements, and the round trip delays for exchange of seeds required to achieve security. In addition, the disclosed methods and systems provide a mechanism to achieve a degree of security before the encrypting module uses the key. This allows generation of session keys more easily and without requiring frequent changes to the master key.

Some of the disclosed methods utilize sharing a random signal from one of the communicators involved in the communication and create unique session keys based on the publicly sent random signal. According to one aspect of these methods, each of the pair of communicators share a unique master key prior to any session communication. The master key is mathematically combined with the randomly generated public signal to form the unique session key.

The disclosed technology has a number of advantages over the existing mechanism of generating session key that can be used for encryption and decryption. The disclosed technology provides a mechanism to generate session keys more easily and with lesser transactional communications between the communicators. Not only does this provide a faster way to generate and manage keys compared to the existing technology, but also helps in creating a large subset of session keys similar to using one-time pads.

Exemplary Computing Environment

Figure 6:
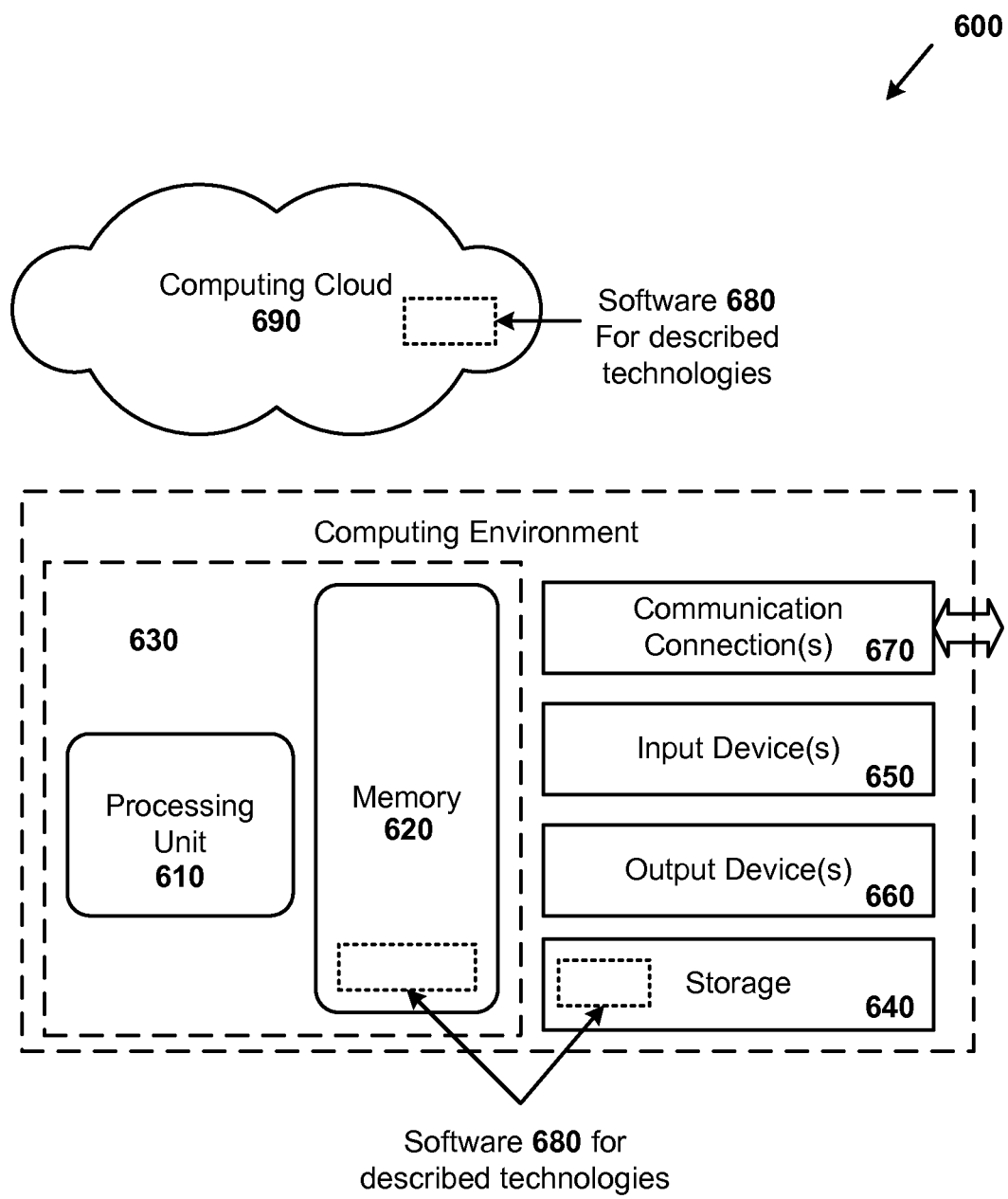
FIG. 6 illustrates a generalized example of a suitable computing environment in which described embodiments, techniques, and technologies can be implemented.

FIG. 6 illustrates a generalized example of a suitable computing environment 600 in which described embodiments, techniques, and technologies can be implemented. For example, the computing environment 600 can implement the disclosed systems and methods for generating a cryptographic session key based on a known master key shared between a sender communicator and a receiver communicator in a communication network, as can be used in accordance with certain embodiments of the disclosed technology.

The computing environment 600 is not intended to suggest any limitation as to scope of use or functionality of the technology, as the technology can be implemented in diverse general-purpose or special-purpose computing environments. For example, the disclosed technology can be implemented with other computer system configurations, including hand held devices, multiprocessor systems, microprocessor-based or programmable consumer electronics, network PCs, minicomputers, mainframe computers, and the like. The disclosed technology can also be practiced in distributed computing environments where tasks are performed by remote processing devices that are linked through a communications network. In a distributed computing environment, program modules can be located in both local and remote memory storage devices.

With reference to FIG. 6, the computing environment 600 includes at least one central processing unit 610 and memory 620. In FIG. 6, this basic configuration 630 is included within a dashed line. The central processing unit 610 executes computer-executable instructions and can be a real or a virtual processor (e.g., ultimately executing on processor hardware). In a multi-processing system, multiple processing units execute computer-executable instructions to increase processing power and as such, multiple processors can be running simultaneously. The memory 620 can be volatile memory (e.g., registers, cache, RAM), non-volatile memory (e.g., ROM, EEPROM, flash memory, etc.), or some combination of the two. The memory 620 stores software 680 that can, for example, implement the technologies described herein. A computing environment can have additional features. For example, the computing environment 600 includes storage 640, one or more input devices 650, one or more output devices 660, and one or more communication connections 670. An interconnection mechanism (not shown) such as a bus, a controller, or a network, interconnects the components of the computing environment 600. Typically, operating system software (not shown) provides an operating environment for other software executing in the computing environment 600, and coordinates activities of the components of the computing environment 600.

The storage 640 can be removable or non-removable, and includes magnetic disks, magnetic tapes or cassettes, CD-ROMs, CD-RWs, DVDs, or any other medium which can be used to store information and that can be accessed within the computing environment 600. The storage 640 stores instructions for the software 680, which can implement technologies described herein.

The input device(s) 650 can be a touch input device, such as a keyboard, keypad, mouse, touch screen display, pen, or trackball, a voice input device, a scanning device, or another device, that provides input to the computing environment 600. For audio, the input device(s) 650 can be a sound card or similar device that accepts audio input in analog or digital form, or a CD-ROM reader that provides audio samples to the computing environment 600. The output device(s) 660 can be a display, printer, speaker, CD-writer, or another device that provides output from the computing environment 600.

The communication connection(s) 670 enable communication over a communication medium (e.g., a connecting network) to another computing entity. The communication medium conveys information such as computer-executable instructions, compressed graphics information, video, or other data in a modulated data signal.

Some embodiments of the disclosed methods can be performed using computer-executable instructions implementing all or a portion of the disclosed technology in a computing cloud 690. For example, generating a cryptographic session key based on a known master key shared between a sender communicator and a receiver communicator in a communication network can be performed on servers located in the computing cloud 690.

Computer-readable media are any available media that can be accessed within a computing environment 600. By way of example, and not limitation, with the computing environment 600, computer-readable media include memory 620 and/or storage 640. As should be readily understood, the term computer-readable storage media includes the media for data storage such as memory 620 and storage 640, and not transmission media such as modulated data signals.

Any of the methods described herein can be performed via one or more computer-readable media (e.g., storage or other tangible media) comprising (e.g., having or storing) computer-executable instructions for performing (e.g., causing a computing device to perform) such methods. Operation can be fully automatic, semi-automatic, or involve manual intervention.

Any of the methods described herein can be implemented by computer-executable instructions stored in one or more computer-readable storage devices (e.g., memory, magnetic storage, optical storage, or the like). Such instructions can cause a computer to perform the method.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments can be used with or perform operations in accordance with the teachings described herein. Elements of embodiments shown in software can be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

We claim:

1. A method for generating a cryptographic session key based on a known master key shared between a sender communicator and a receiver communicator in a communication network, the method comprising:

receiving at one of the sender communicator or the receiving communicator, a request transmitted from the other of the receiver communicator or the sender communicator, for establishing a communication session between the sender communicator and the receiver communicator;

generating an open random number signal at the sender communicator and transmitting the generated open random number signal to the receiver communicator; and generating the cryptographic session key at the receiver communicator, by combining at the receiver communicator, the generated open random number signal received from the sender communicator with the known master key, wherein inputs to the step of combining and generating the cryptographic session key at the receiver communicator exclude any form of random number signal generated at the receiver communicator.

2. The method of claim 1, wherein the open random number signal and the master key are combined by splitting the master key and inserting at least a part of the open random number signal within each split part of the master key.

3. The method of claim 1, wherein the sender and the receiver communicator form a client-server network.

4. The method of claim 1, wherein the sender and the receiver communicator form a peer-to-peer network.

5. The method of claim 1, wherein the sender communicator sending the request to generate the open random signal is a client.

6. The method of claim 1, wherein the receiver communicator receiving the request to generate the open random signal is a server.

7. The method of claim 1, wherein the master key is shared between the sender and the receiver communicator prior to any session communication.

8. The method of claim 1, wherein each of the sender and the receiver communicator is synchronized to switch its state at periodic intervals.

9. The method of claim 1, further comprising, at the sender communicator, the act of combining the generated open random number signal with the known master key to generate the cryptographic session key, wherein inputs to the step of combining and generating the cryptographic session key at the sender communicator exclude any form of random number signal generated at the receiver communicator.

10. A system for generating a cryptographic session key, the system comprising at least a sender communicator and a receiver communicator, the receiver communicator comprising:
a transceiver configured to receive an open random signal generated at a sender communicator;
at least one processor configured to:
generate the open random signal;
create a subset of the open random number signal and a master key; and
generate the cryptographic session key at the receiver communicator, by combining the generated open random signal received from the sender communicator with the master key, wherein inputs to the step of combining and generating the cryptographic session key excludes any form of random number signal generated at the receiver communicator.

11. The system of claim 10, wherein the sender and the receiver communicator form a client-server network.

12. The system of claim 10, wherein the sender and the receiver communicator form a peer-to-peer network.

13. The system of claim 10, wherein the sender communicator sending the request to generate the open random signal is a client.

14. The system of claim 10, wherein the receiver communicator receiving the request to generate the open random signal is a server.

15. The system of claim 10, wherein the at least one processor of each of the server and the receiver communicator is further configured for encryption/decryption.

16. The system of claim 10, wherein the open random signal is an input for creating the subset of the open random number signal and the master key.

17. The system of claim 10, wherein the master key is an input for creating the subset of the open random number signal and the master key.

18. The system of claim 10, wherein the at least one processor of the sender communicator and the receiver communicator is synchronized to switch its state at periodic intervals.

19. The system of claim 10, wherein the at least one processor is further configured to determine a section of the master key used in forming the session key.

20. The system of claim 10, wherein the receiver communicator further comprises:
at least one receiver processor configured to:
receive the open random signal,
create a subset of the open random number signal and a master key, and
combine the generated open random signal with the master key to generate the cryptographic session key, wherein inputs to the acts of combining and generating the cryptographic session key exclude any form of random number signal generated by the at least one receiver processor.

21. A computer program product for use with a computer, the computer program product comprising a non-transitory computer-readable storage medium having a computer readable program code stored therein for generating a cryptographic session key based on a known master key shared between a sender communicator and a receiver communicator in a communication network, the computer readable program code including a set of instructions that when executed by a computer, cause the computer to perform a method, the method comprising:
receiving at one of the sender communicator or the receiving communicator, a request transmitted from the other of the receiver communicator or the sender communicator, for establishing a communication session between the sender communicator and the receiver communicator;
generating an open random number signal at the sender communicator and transmitting the generated open random number signal to the receiver communicator; and
generating the cryptographic session key at the receiver communicator, by combining at the receiver communicator, the generated open random number signal received from the sender communicator with the known master key, wherein inputs to the step of combining and generating the cryptographic session key at the receiver communicator exclude any form of random number signal generated at the receiver communicator.

22. The computer program product of claim 21, wherein the sender communicator and the receiver communicator form a client-server network.

23. The computer program product of claim 21, wherein the method further comprises, at the sender communicator, the act of combining the generated open random number signal with the known master key to generate the cryptographic session key, wherein inputs to the acts of combining and generating the cryptographic session key at the sender communicator exclude any form of random number signal generated at the receiver communicator.

* * * * *